US012702139B2

(12) United States Patent
Chappell

(10) Patent No.: US 12,702,139 B2
(45) Date of Patent: Aug. 11, 2026

(54) LOIN PULLER MACHINE WITH IMPROVED CATERPILLAR DRIVE ASSEMBLY

(71) Applicant: Hall Fabrication, Inc., Henderson, NV (US)

(72) Inventor: David Chappell, Las Vegas, NV (US)

(73) Assignee: Hall Fabrication, Inc., Henderson, NV (US)

( * ) Notice: Subject to any disclaimer, the term of this patent is extended or adjusted under 35 U.S.C. 154(b) by 55 days.

(21) Appl. No.: 18/827,283

(22) Filed: Sep. 6, 2024

(65) Prior Publication Data

US 2026/0068896 A1 Mar. 12, 2026

(51) Int. Cl.
*A22C 17/00* (2006.01)
*A22C 17/02* (2006.01)

(52) U.S. Cl.
CPC .......... *A22C 17/02* (2013.01); *A22C 17/0033* (2013.01); *A22C 17/0093* (2013.01)

(58) Field of Classification Search
CPC ... A22B 5/0094; A22C 17/02; A22C 17/0033; A22C 17/0093
USPC .......................................................... 452/171
See application file for complete search history.

(56) References Cited

U.S. PATENT DOCUMENTS 5,407,384 A * 4/1995 Boody ................. A22B 5/0005 452/134
5,882,252 A * 3/1999 Boody ................. A22B 5/0041 452/136
6,155,919 A * 12/2000 Haagensen ........ A22C 17/0046 452/158
7,214,129 B2 * 5/2007 Couture ............. A22C 17/0046 452/171
2002/0031996 A1 * 3/2002 Dufour ................ A22B 5/0005 452/171
2006/0035576 A1 * 2/2006 Bruce .................. A22B 5/0035 452/171
2006/0052043 A1 * 3/2006 Couture ............. A22C 17/0046 452/171
2007/0184767 A1 * 8/2007 Roy ................... A22C 17/0046 452/171

* cited by examiner

*Primary Examiner* — Richard T Price, Jr.
(74) *Attorney, Agent, or Firm* — McKee, Voorhees & Sease, PLC

(57) ABSTRACT

A loin puller machine includes a frame with the conveyor mounted on the frame for carrying loin carcasses past a series of cutting blades. A caterpillar drive assembly is mounted on the frame adjacent the conveyor to engage the carcass for movement past the blades. The caterpillar drive assembly includes a pair of sprockets and a chain trained about the sprockets, and a hydraulic motor operatively connected to one of the sprockets so as to rotate the sprockets and chain. The motor is positioned below the sprockets and chains to preclude accidental dripping of hydraulic fluid onto the sprockets, chain, or loin carcass.

17 Claims, 11 Drawing Sheets

LOIN PULLER MACHINE WITH IMPROVED CATERPILLAR DRIVE ASSEMBLY

TECHNICAL FIELD

This invention relates to the meat processing industry, and particularly to a loin puller machine having an improved caterpillar drive assembly.

BACKGROUND

In the pork processing industry, the carcass is initially cut into six portions, including the left and right front and hind quarters, the left and right middle loin portions. The loin portion is further processed on a loin puller machine which separates the loin meat from the middle carcass portion. A conventional loin puller machine is shown and described in U.S. Pat. No. 5,882,252. One aspect of the conventional loin puller machine is an impeller assembly, also known as a caterpillar (cat) or track drive, which forces the chine of the middle carcass against a load bar so as to straighten the chine and align the carcass with a series of knives on the loin puller machine. The impeller assembly includes a chain trained about sprockets, with a hydraulic motor to rotate one sprocket and thereby drive the chain in an endless loop to facilitate cutting of the loin. One problem with the conventional impeller assembly arises when the hydraulic motor leaks, thus spilling hydraulic fluid or oil onto the drive sprocket, chain, and the carcass. The contaminated carcass must be removed, and thrown out or cleaned, thereby reducing production and profits.

Therefore, a primary objective of the present invention is the provision of a loin puller machine having an improved caterpillar drive assembly to preclude contamination of the meat by a failed hydraulic motor.

A further objective of the present invention is the provision of a caterpillar or track drive assembly for a loin puller machine which positions the hydraulic motor beneath the sprockets and chain, such that any oil or fluid leakage does not coat the sprocket or chain, and thereby avoids any spillage or bathing onto the carcass.

A further objective of the present invention is the provision of a method of conveying a carcass for cutting by a knife on a loin puller machine wherein the carcass is engaged by a chain assembly having a hydraulic motor beneath the chain assembly.

Yet another objective of the present invention is the provision of a loin puller machine having a hydraulic motor for driving a caterpillar assembly, wherein the motor is positioned on the loin puller machine so as to avoid spillage of any hydraulic fluid onto the carcasses.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

SUMMARY

A loin puller machine is provided with an improved caterpillar drive assembly which precludes potential contamination of the meat by failure or leakage of the motor. The loin puller machine includes a frame with a conveyor for carrying the loin through a series of cutting blades. The caterpillar drive assembly facilitates cutting of the loin carcass. The caterpillar drive assembly includes a chain trained about a pair of sprockets, with a hydraulic motor to rotatably drive one of the sprockets, such that the chain helps guide and pull the carcass past the blades. The motor is operatively connected to the drive sprocket and is positioned below the drive sprocket and chain. This orientation of the motor beneath the sprocket and chain eliminates risk of contaminating the carcass with hydraulic fluid in the event of a motor failure or leak.

DETAILED DESCRIPTION

Figure 1:
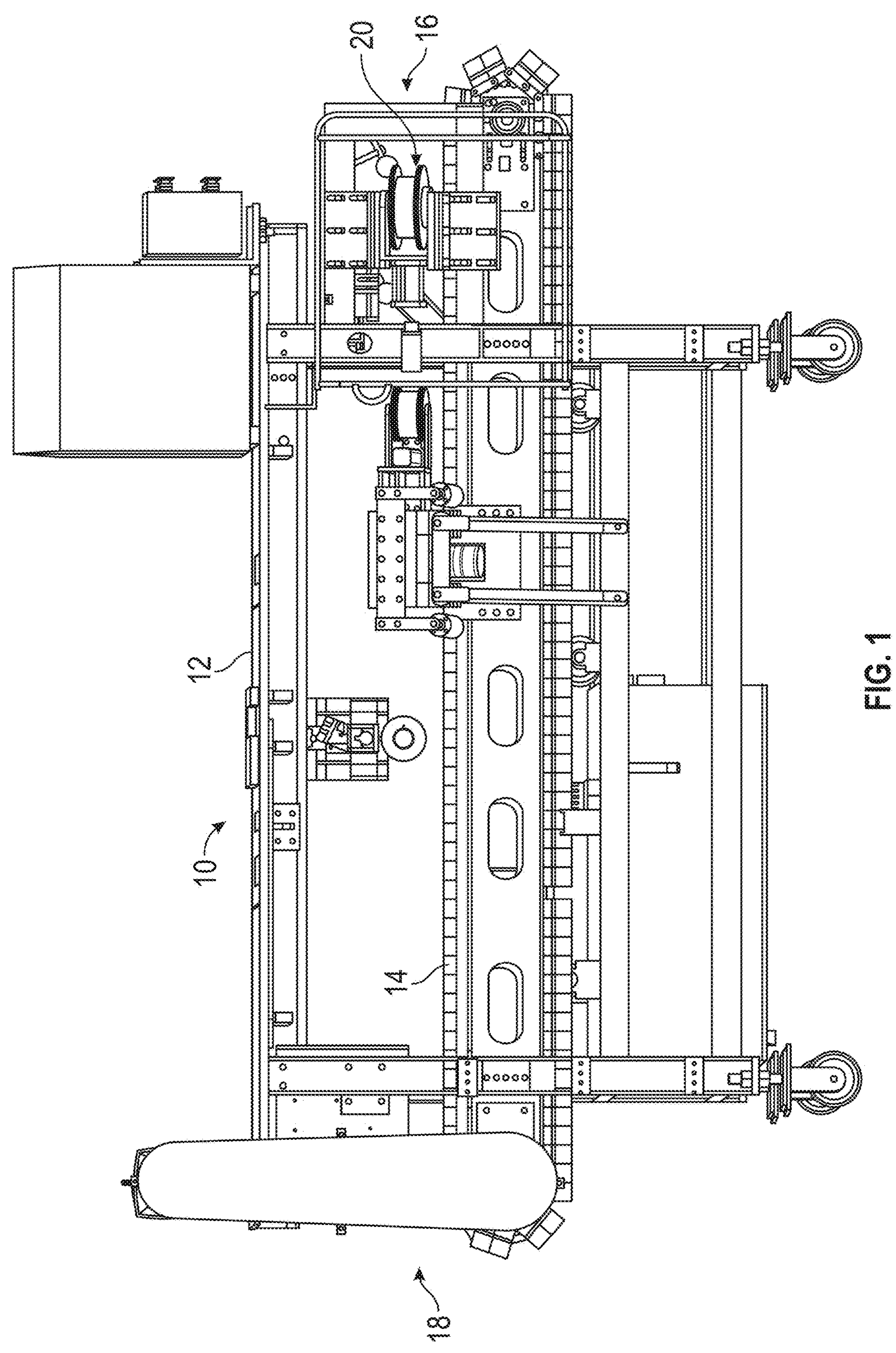
FIGS. 1 and 2 are side elevation views of a loin puller machine according to the present invention, from opposite sides of the machine.
Figure 2:
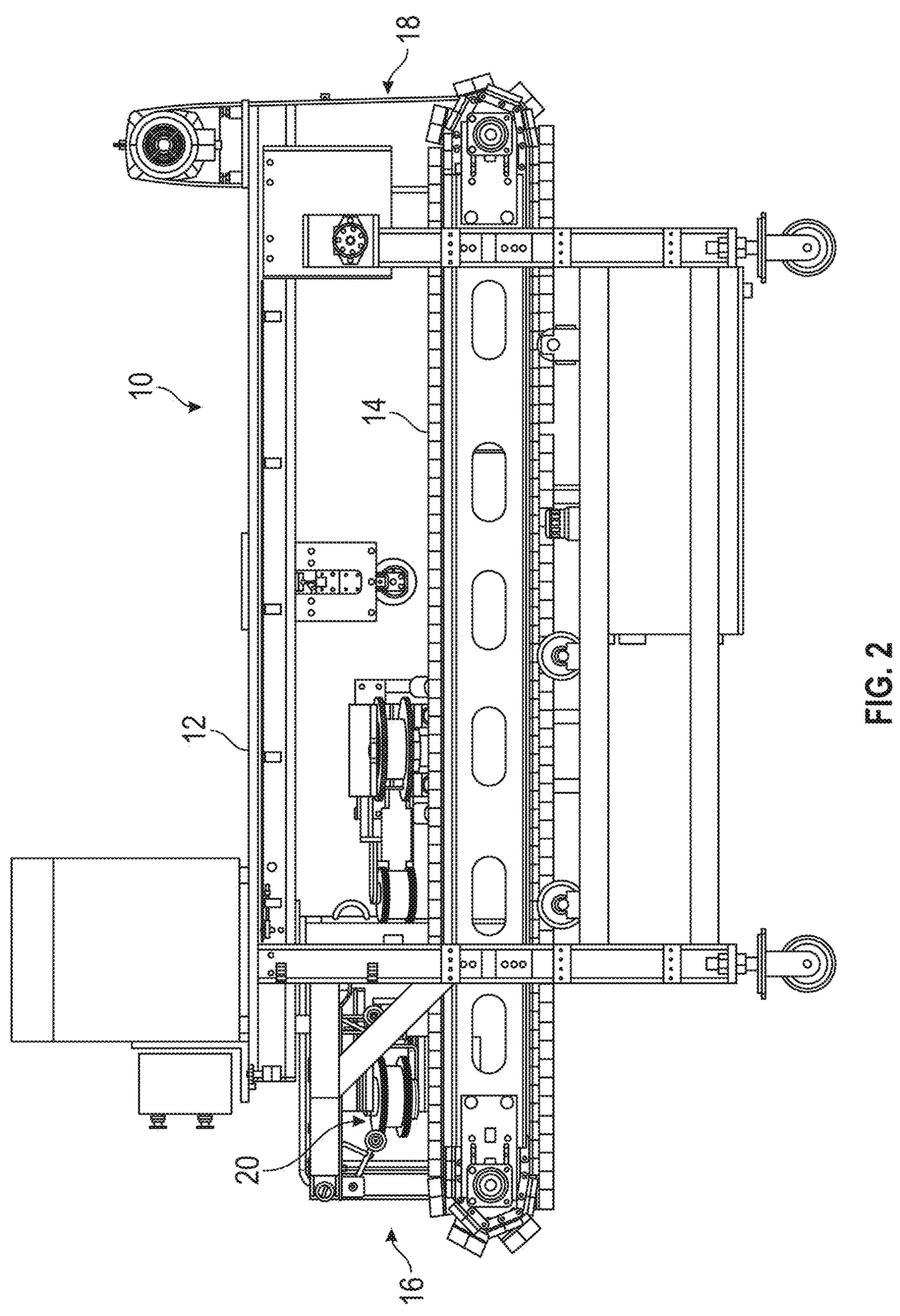

FIGS. 1-4 show the basic structure of a loin puller machine 10. The machine includes a frame 12 and a conveyor 14 operatively mounted on the frame 12. The conveyor 14 has an inlet end 16 and an outlet end 18. The conveyor 14 receives loin carcasses at the inlet end 16 and carries the carcasses past a series of cutting blades, (not shown), including a J blade, a Z blade, and a hoop blade, each of which cut specific portions of the carcass. The blades are described in Applicant's co-pending application Ser. No. 18/416,535 entitled Sweep Edge Blades for Loin Puller Machine, which is incorporated herein by reference in its entirety. The conveyor 14 is preferably in the form of a conveyor described in Applicant's co-pending application Ser. No. 18/416,090 entitled Loin Puller Conveyor, which is incorporated herein by reference in its entirety. It is understood that other types of conveyors and blades may be used in the loin puller machine 10, without departing from the scope of the invention.

The machine includes a caterpillar or track drive assembly 20 (sometimes referred to as a cat drive), positioned near the inlet end 16 of the conveyor 14. The caterpillar drive assembly 20 helps direct each carcass through the blades for cutting the various portions of meat from the carcass. The caterpillar drive assembly 20 includes first and second sprockets 22, 24 having a chain 26 trained around the sprockets 22, 24. The chain 26 may take various forms, and may include projections for gripping the carcass to facilitate movement of the carcass along the conveyor 14 and through the blades.

Figure 3:
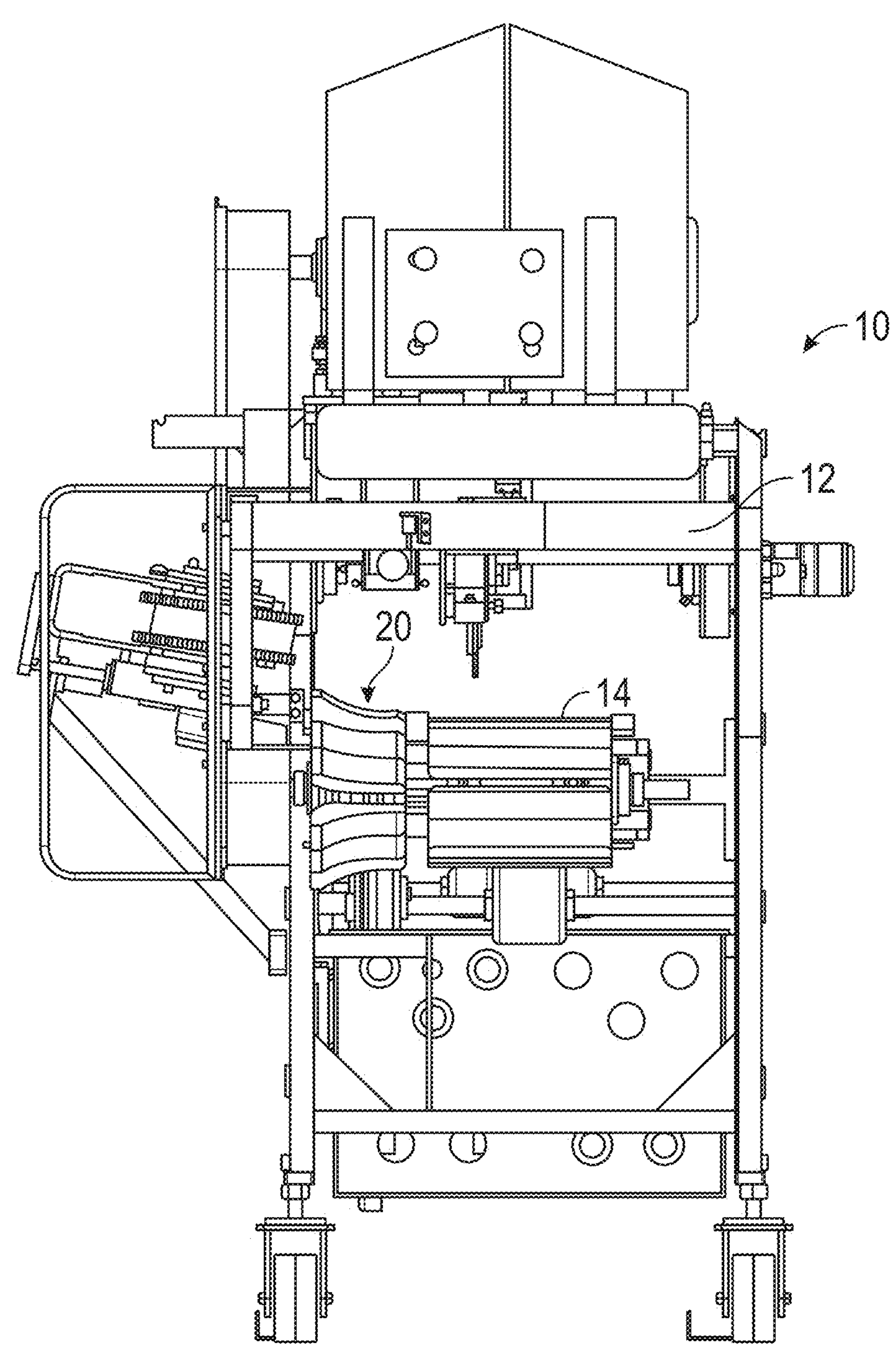
FIG. 3 is an end elevation view of the loin puller machine shown in FIGS. 1 and 2, from the inlet end.
Figure 4:
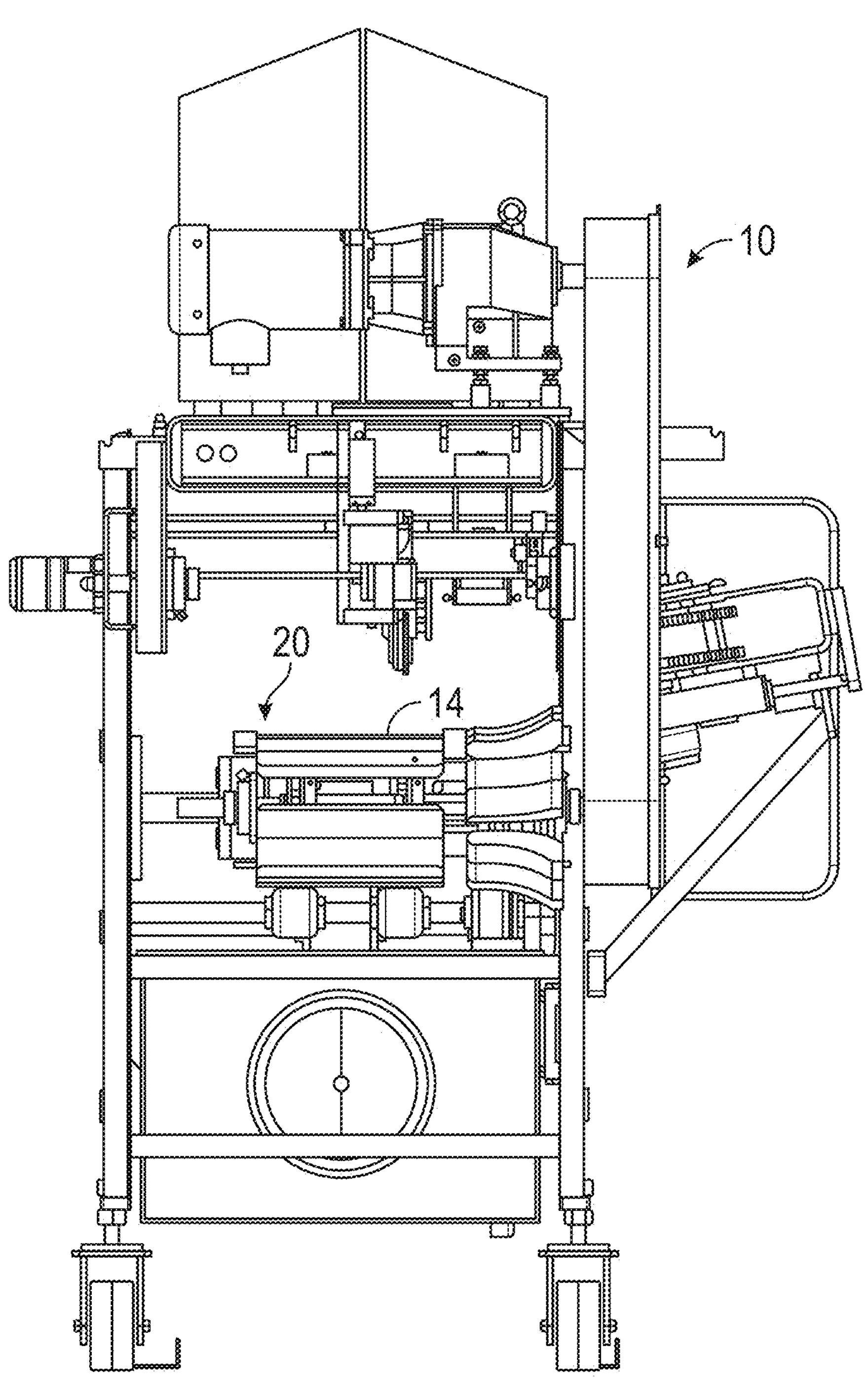
FIG. 4 is an end elevation view of the loin puller machine shown in FIGS. 1 and 2, from the exit end of the machine.
Figure 5:
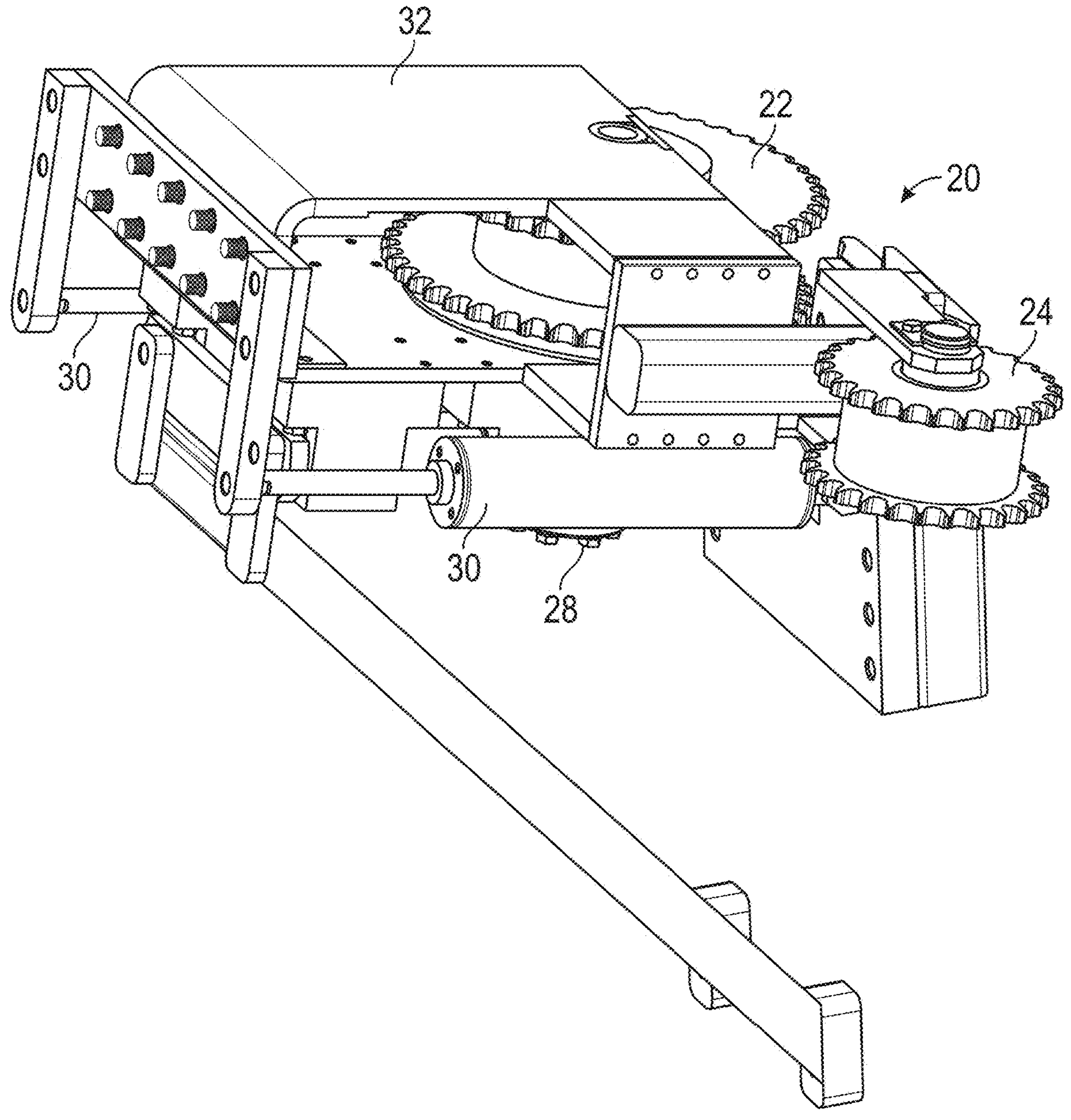
FIG. 5 is an upper perspective view of the caterpillar drive assembly used on the loin puller machine shown in FIGS. 1 and 2.

The first sprocket 22 is driven by a hydraulic motor 28 which is mounted on the bottom side of the sprocket 22, as best seen in FIGS. 6-8 and 11. Thus, the sprocket 22 is a drive sprocket and the sprocket 24 is an idler sprocket. The cat drive assembly, including the sprockets 22, 24, chain 26, and the motor 28 are laterally offset from the conveyor 14, as best seen in FIGS. 3 and 4.

The position of the motor 28 beneath the first sprocket 22 eliminates or minimizes the risk of hydraulic fluid leaking onto the sprocket 22 or the chain 26 if the motor fails, thereby preventing potential contamination of the carcass with hydraulic fluid, as was known to occur in conventional loin puller machines wherein the caterpillar assembly drive motor was mounted above the drive sprocket and chain.

Figure 6:
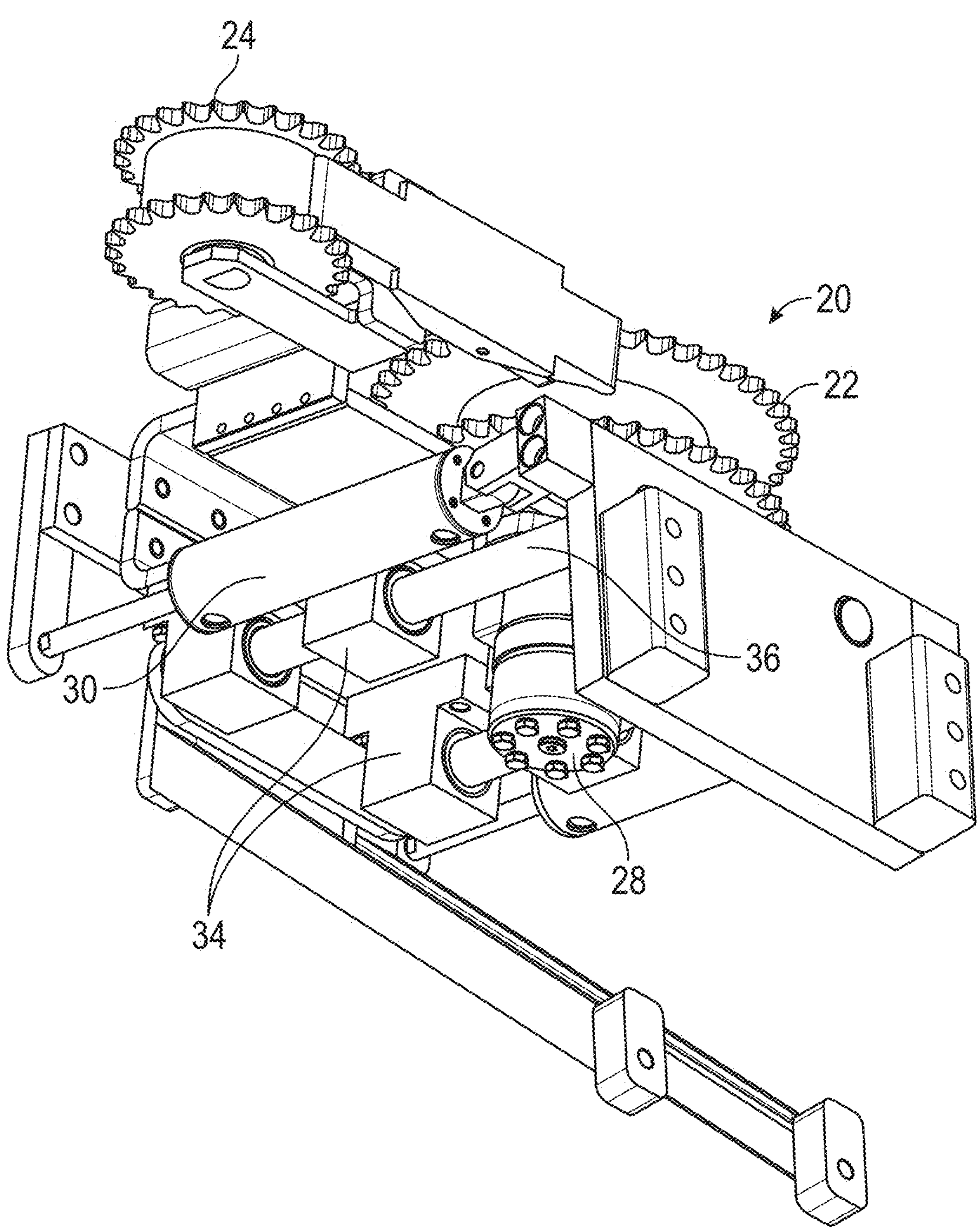
FIG. 6 is a lower perspective view of the caterpillar drive assembly used on the loin puller machine shown in FIGS. 1 and 2.
Figure 7:
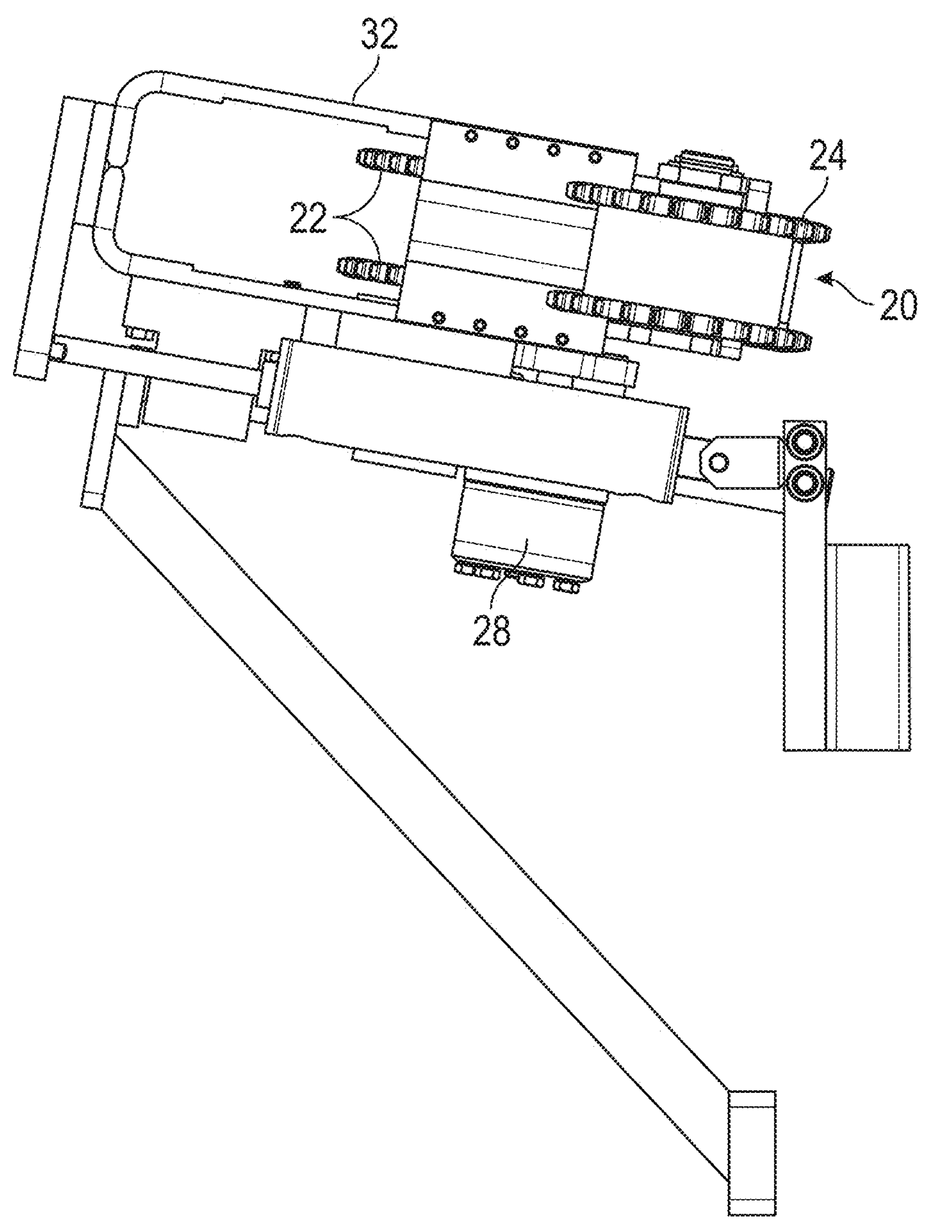
FIG. 7 is an end elevation view of the caterpillar drive assembly, from the inlet end of the machine.
Figure 8:
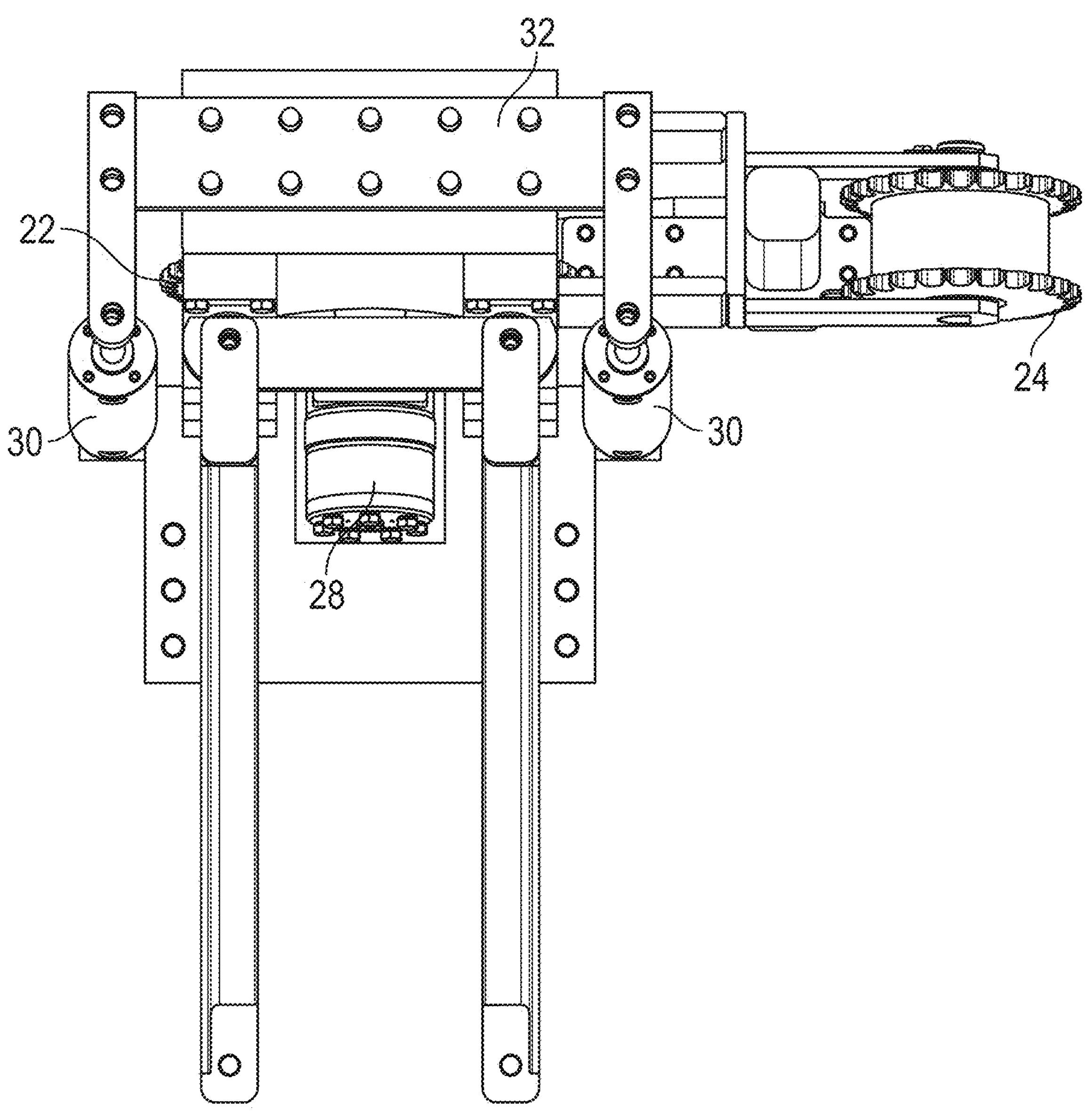
FIG. 8 is a left side elevation view of the caterpillar drive assembly.
Figure 9:
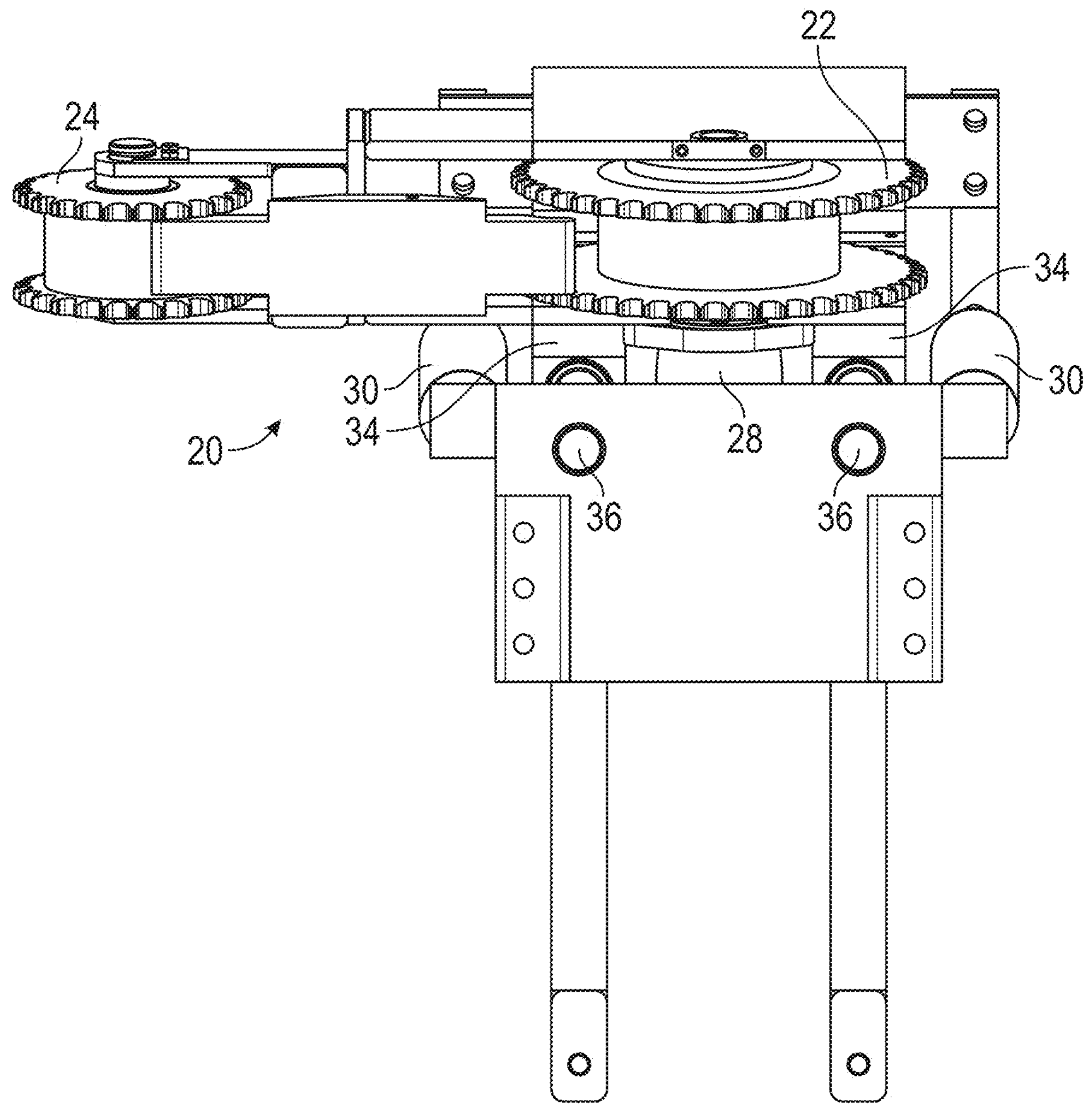
FIG. 9 is a right side elevation view of the caterpillar drive assembly.
Figure 10:
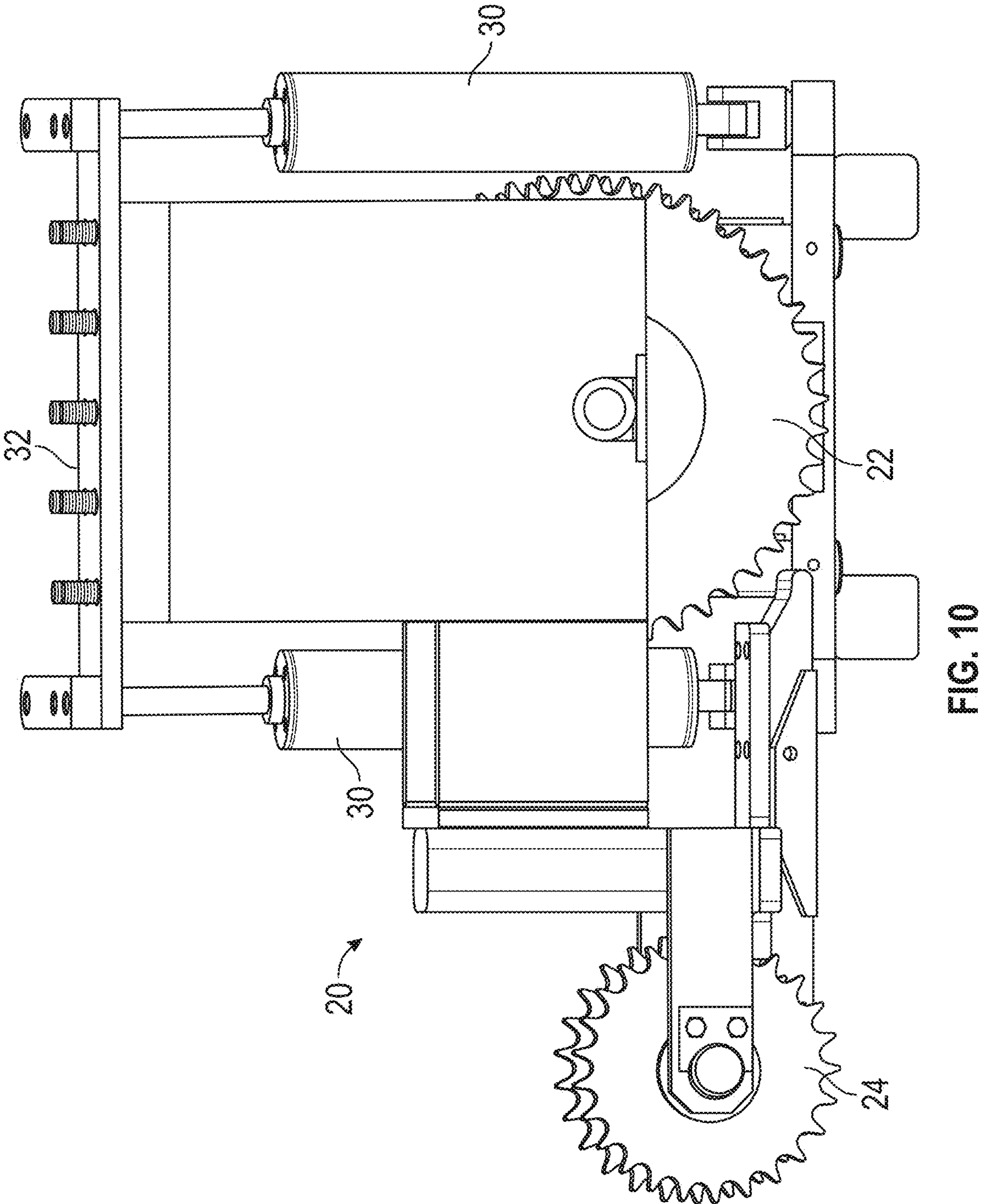
FIG. 10 is a top plan view of the caterpillar drive assembly.
Figure 11:
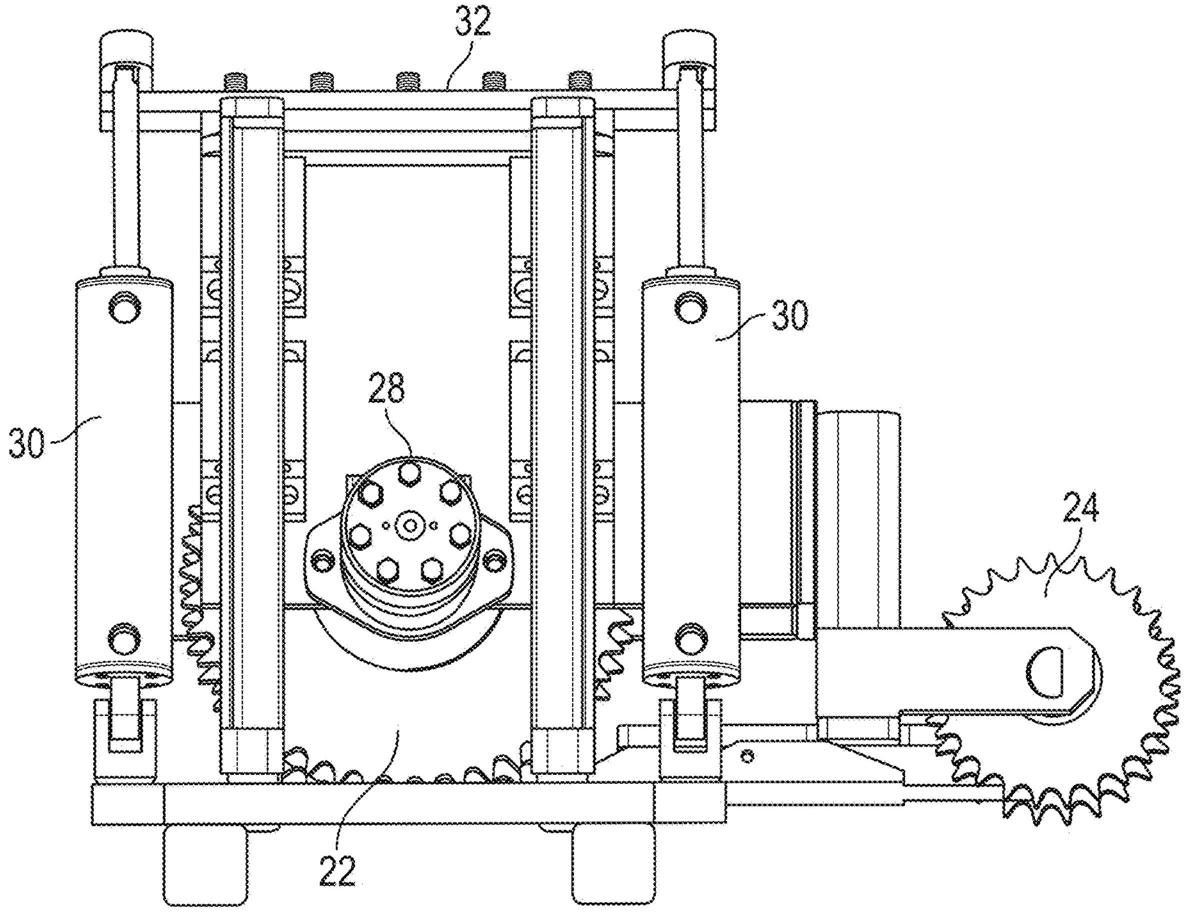
FIG. 11 is a bottom plan view of the caterpillar drive.

The drive sprocket assembly 20 is slidably or adjustably mounted on the loin puller machine for movement toward and away from the conveyor 14 and carcasses thereon. The assembly includes a bracket with guide blocks 34 slidably mounted on slide rods 36, as best seen in FIG. 6. The bracket supports the drive sprocket assembly 20. The lateral movement of the sprocket 22 and the motor 28 is controlled by one or more actuators, such as hydraulic cylinders 30 connected to bracket. The cylinders 30 can be extended and retracted so that the caterpillar drive assembly 20 can be moved between a first position engaging the carcass and a second position disengaged from the carcass.

In the method of the present invention, the carcass is positioned on the horizontal conveyor 14, which is then actuated to move the carcass past the knives. The caterpillar drive assembly 20 is moved into engagement with the carcass by the cylinders 30 to help pull the carcass through the blades by driving the sprocket and chain assembly via the hydraulic motor 28 positioned beneath the sprocket and chain assembly. If the motor 28 develops a leak, the leaking hydraulic fluid will drip by gravity downwardly, away from the sprocket 22 and chain 24, and not onto the carcass.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A loin puller machine, comprising:

a frame;

a conveyor on the frame for carrying a loin carcass;

a track drive assembly mounted on the frame at an elevation higher than the conveyor and having sprockets and a chain trained about the sprockets to engage the loin carcass on the conveyor; and a hydraulic motor operatively connected to the track drive assembly to rotate the sprockets and chain, and being positioned below the track drive assembly.

2. The loin puller machine of claim 1 wherein the hydraulic motor is lower than the sprockets.

3. The loin puller machine of claim 1 wherein the hydraulic motor is beneath the chain.

4. The loin puller machine of claim 1 wherein the hydraulic motor is spaced laterally apart from the conveyor.

5. A track drive assembly for a loin puller machine having a conveyor for transporting carcasses from an inlet end to an outlet end, the track assembly comprising:

first and second sprockets adjacent the conveyor;

a chain extending around the sprockets to engage the carcass;

a motor drivingly connected to the first sprocket to rotate the first sprocket and thereby drive the chain around the first and second sprockets; and the motor being mounted beneath the first sprocket to preclude contamination of the track drive assembly in the event of a motor failure.

6. The track drive assembly of claim 5 wherein the motor is a hydraulic motor.

7. The track drive assembly of claim 5 wherein the motor is below the chain.

8. The track drive assembly of claim 5 wherein the motor is laterally offset from the conveyor.

9. The track drive assembly of claim 5 further comprising a bracket to support the sprockets and motor.

10. The track drive assembly of claim 9 wherein the sprockets and motor are slidably mounted on the bracket.

11. The track assembly of claim 10 further comprising an actuator to slide the sprockets and motor into engagement with the carcass on the conveyor.

12. A method of conveying a carcass for cutting by a knife on a loin puller machine, comprising:

positioning the carcass on a horizontal conveyor assembly;

actuating the conveyor assembly to move the carcass past the knife;

engaging the carcass laterally with a chain assembly as the carcass is moved past the knife; and rotating the chain assembly with a motor positioned beneath the chain assembly.

13. The method of claim 12 wherein the motor is a hydraulic motor.

14. The method of claim 12 further comprising moving the chain assembly and motor laterally into engagement with the carcass before the carcass engages the knife.

15. The method of claim 13 further comprising moving the chain assembly and motor laterally out of engagement with the carcass after the carcass is cut by the knife.

16. The method of claim 12 further comprising directing any fluid from the motor away for the chain assembly in the event of failure of the motor.

17. The method of claim 12 wherein fluid from a motor failure flows by gravity away from the chain assembly.

* * * * *